(12) United States Patent
Djuricic et al.

(10) Patent No.: US 7,968,483 B2
(45) Date of Patent: Jun. 28, 2011

(54) FIRED REFRACTORY CERAMIC PRODUCT

(75) Inventors: Boro Djuricic, Leoben (AT); Franz Reiterer, Leoben (AT)

(73) Assignee: Refractory Intellectual Property GmbH & Co. KG, Vienna (AT)

( * ) Notice: Subject to any disclaimer, the term of this patent is extended or adjusted under 35 U.S.C. 154(b) by 170 days.

(21) Appl. No.: 12/374,833

(22) PCT Filed: Aug. 8, 2007

(86) PCT No.: PCT/EP2007/007000
§ 371 (c)(1),
(2), (4) Date: Jan. 23, 2009

(87) PCT Pub. No.: WO2008/025441
PCT Pub. Date: Mar. 6, 2008

(65) Prior Publication Data
US 2010/0004114 A1    Jan. 7, 2010

(30) Foreign Application Priority Data

Aug. 28, 2006  (DE) .......................... 10 2006 040 269

(51) Int. Cl.
| | |
|---|---|
| C04B 35/80 | (2006.01) |
| C04B 35/043 | (2006.01) |
| C04B 35/101 | (2006.01) |
| C04B 35/14 | (2006.01) |
| C04B 35/482 | (2006.01) |
| C04B 35/567 | (2006.01) |
| C04B 35/58 | (2006.01) |

(52) U.S. Cl. .......... 501/80; 501/88; 501/97.1; 501/96.3; 501/98.1; 501/128

(58) Field of Classification Search .................... 501/88, 501/96.3, 97.1, 98.1, 105, 127, 128, 80
See application file for complete search history.

(56) References Cited

U.S. PATENT DOCUMENTS

| | | | |
|---|---|---|---|
| 4,069,058 A * | 1/1978 | Washburn | .................... 501/96.5 |
| 4,218,254 A | 8/1980 | Kiehl et al. | |
| 6,171,990 B1 * | 1/2001 | Petschauer | .................... 501/128 |

(Continued)

FOREIGN PATENT DOCUMENTS

DE    2609251 A1    9/1976

(Continued)

OTHER PUBLICATIONS

Yung-Chao Ko; "Influence of the total fines content on the thermal shock damage resistance of Al2O3-spinel castables"; Ceramics International; 2001; pp. 501-507; vol. 27; No. 5; Elsevier, Amsterdam, NL.

(Continued)

*Primary Examiner* — Karl E Group
(74) *Attorney, Agent, or Firm* — Christopher L. Parmelee; Walker & Jocke

(57) ABSTRACT

The invention relates to a fired refractory ceramic product. According to the invention, this generic term encompasses both shaped and unshaped products. Shaped products are ones which have a defined shape so that they can be manufactured in finished form on the premises of the manufacturer. Shaped products include: bricks, nozzles, tubes, stoppers, plates, etc. The term unshaped products includes ones which are usually produced by the user from a corresponding composition. They include bases for furnaces which are cast from a composition but also repair compositions, etc.

14 Claims, 3 Drawing Sheets

U.S. PATENT DOCUMENTS

| | | | |
|---|---|---|---|
| 6,239,053 B1 * | 5/2001 | Petschauer et al. | 501/128 |
| 6,887,809 B1 * | 5/2005 | Adler | 501/88 |
| 7,767,292 B2 * | 8/2010 | Djuricic et al. | 428/314.2 |
| 2007/0203013 A1 | 8/2007 | Harmuth | |
| 2008/0160279 A1 | 7/2008 | Djuricic et al. | |

FOREIGN PATENT DOCUMENTS

| | | |
|---|---|---|
| DE | 10054125 A1 | 5/2002 |
| EP | 0004509 A2 | 10/1979 |
| WO | 2005085155 A1 | 9/2005 |
| WO | 2007006350 A1 | 1/2007 |

OTHER PUBLICATIONS

Harald Harmuth; "Measurement and Characterization of the Periclase Crystal Size in Products of the Magnesite Industry and in Sintered Magnesia"; 1989; pp. 172-182; Heft 4; Radex-Rundschau.

* cited by examiner

FIRED REFRACTORY CERAMIC PRODUCT

The invention relates to a fired, refractory ceramic product. Within the scope of the invention, this generic concept includes both shaped and non-shaped products. Shaped products are those which have a defined shape, so that they can be produced as finished, ready-made products at the manufacturer's premises. Shaped products include bricks, nozzles, tubes, stoppers, plates, etc. The expression non-shaped products includes those which are usually prepared from an appropriate compound (mass) by the user. These include furnace bottoms which are cast from a compound as well as compounds used for repair purposes, etc.

Shaped products may be delivered to the user fired (burnt) or non-fired (unburnt). Like non-shaped products, shaped products are also fired at the latest at the time they are to be used, to which end they are heated to at least the temperatures at which the mixture components sinter.

In this connection, the expression refractory mixture-material includes both materials which already have refractory properties and materials which do not become refractory until during/after the temperature treatment (firing).

Refractory (also called fireproof) ceramic products of this type have long been known in many forms. The requirements placed on such products vary depending on the respective application. In principle, a high resistance to temperature is required. For lining cement rotary kilns, it is often sufficient to use products which are capable of withstanding temperatures of up to 1,300° C. Fireproof ceramic products used for metallurgical applications (lining melting vessels, nozzles, stoppers, gas plugs, etc.) usually have a temperature resistance of at least 1,400 to 1,700° C. The fire-resistance of products used for lining waste incineration plants is usually between 1300° C. and 1500° C. A resistance to temperatures in excess of 1,700° C. is required for the following applications, for example: glass melting tanks, units for producing and treating molten metals.

Other essential properties and characteristics are: thermal shock resistance, corrosion behaviour, structural elasticity, refractoriness under load, permeability to gas, cold crushing strength following changes in temperature, modulus of rupture at elevated temperatures.

Even then, specific product requirements will depend on specific applications. For example, in furnaces, such as gasification and/or incineration plants, for example waste incineration plants, or in arches in glass tanks, the gas permeability of fireproof ceramic products plays an important role. The aim is to obtain low gas permeability with a view to preventing corrosion of the fireproof ceramic products due to infiltration by aggressive gas elements.

Different criteria apply to products used for lining glass tanks, and especially where a glass melt comes into contact with the refractory material: glass tanks are usually lined with large-format fireproof slabs (for example 0.6×0.4×0.4 m). For this application, therefore, an improvement (reduction) in brittleness is sought, in addition to a low tendency to corrosion.

Patent application DE 100 54 125 A1 describes a batch for producing a fireproof ceramic product. The main component contained in the mixture is a molten phase former, which forms a molten/glass phase at operating temperatures from 700 to 1,300° C. This molten phase should fill the open porosity of the product as far as possible in order to obtain a product that is as dense as possible after firing.

The underlying objective of the invention is to propose a refractory ceramic product which is suitable for high-temperature applications (>1,500° C., in particular >1,700° C.) and, in addition to high temperature resistance, has as many as possible of the following properties: good resistance to thermal shock, good flexibility, high cold crushing strength following changes in temperature, low permeability to gas.

In order to achieve these objectives, comprehensive tests were conducted. From these, the following knowledge was gained, amongst other things.

In addition to the chemical composition, the structure of the fired product primarily plays a crucial role.

The absolute value of the open porosity is not decisive. Instead, it is crucial to form the open porosity so that the resultant permeability to gas is as low as possible.

Open porosity on the one hand and low permeability to gas on the other hand can each be set as a function of structure.

These requirements are satisfied by a structure which, in addition to few coarse particles, predominantly has a fine particulate matrix.

The distance of the coarse particles from one another in terms of size should correspond to 0.7 to 3 times their maximum diameter.

Accordingly, the open porosity is quite predominantly determined by the fine particulate matrix. However, the pores end at the coarse-grained particles of the structure. A sort of "blind pore" occurs in each case. As a result, the associated proportion of pores does not affect permeability to gas.

The proportion of fine particles should account for 50 to 90% by weight (or: 60 to 90% by weight) of the batch and accordingly, the proportion of coarse grains is 10 to 50% by weight respectively 10 to 40% by weight. At the same time, the proportion of particles with a grain size between the fine and coarse grain should be limited to <10% by weight of the total mixture, preferably <5% by weight.

The resultant grain gap is one of the factors which is crucial to the structural pattern of the fired product and its properties.

The upper threshold value for the proportion of fine grains is about ¹⁄₁₀ lower than the lower grain threshold value of the coarse particulate material. The fine particulate refractory material usually falls within a grain size of $d_{90}$<100 μm, often <50 μm, whilst the coarse particulate refractory component has a grain size of $d_{90}$>500 μm, often >1 mm.

DETAILED DESCRIPTIONS OF EXEMPLARY EMBODIMENTS

In its most general embodiment, the invention relates to a fired, fireproof ceramic product, produced from a batch which, in addition to 50 to 90% by weight of fine particulate refractory material with a grain size of $d_{90}$<100 μm, contains another 10 to 50% by weight of coarse particulate refractory material with a grain size of $d_{90}$>500 μm and the proportion of particles with a grain size $d_{90}$ of between 100 and 500 μm is limited to ≦10% by weight.

In one embodiment, the threshold grain size for the fine particulate refractory material is $d_{90}$<50 μm.

Based on percentage, the proportions of fine particulate and coarse particulate refractory material may be varied as follows: 65 to 85:15 to 35 or 70 to 80:20 to 30 respectively 75 to 85:15 to 25, and the proportion of particles with a grain size between the proportions of fine and coarse grains may be limited to values of <5% by weight.

Figure 1:
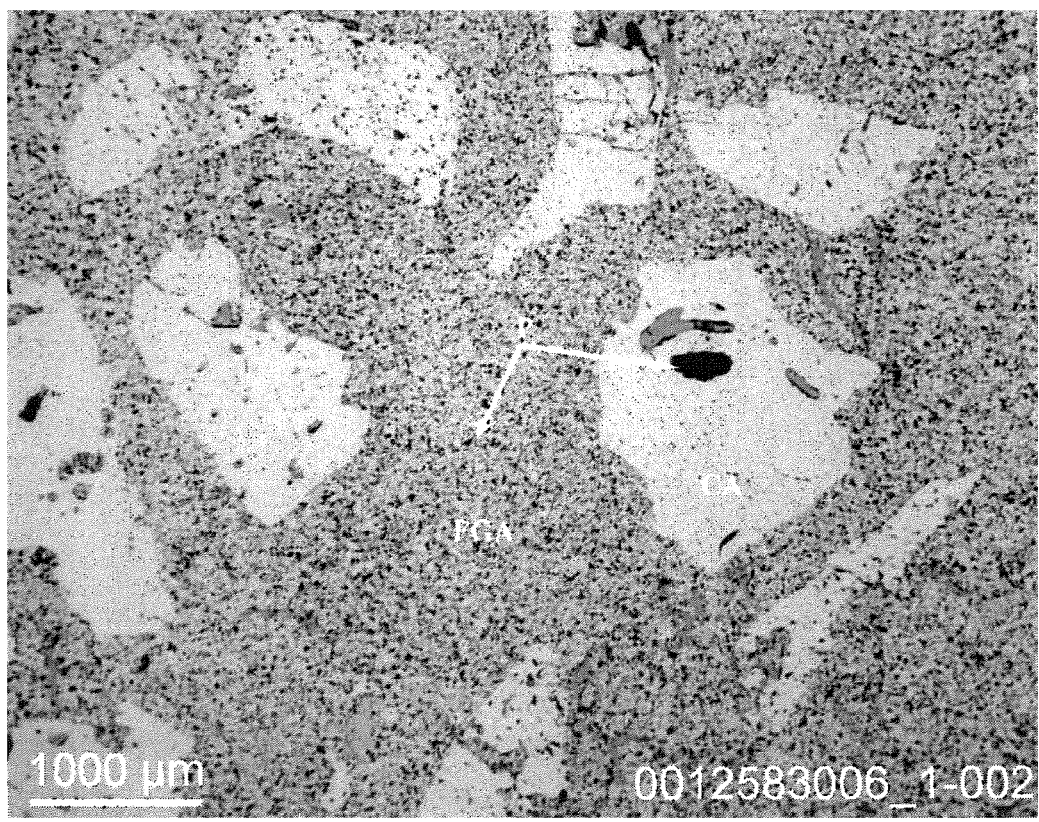
FIG. 1 illustrates a structure of an example fired refractory ceramic product.

The specific grain selected for the mixture is crucial to the structure of the fired product and its properties. The coarse and fine fraction of the mixture is almost always evident accordingly from the fired product. For production purposes, the two components may be prepared in the form of pellets. This being the case, the individual pellets will have a core of said coarse particulate material with a coating of said fine particulate material. During the additional processing which takes place subsequently, more fine material can be added to the mixture. The mixture may be pressed to obtain shaped parts, for example. After firing, usually at in excess of 1,500° C., mostly over 1,700° C., the structural pattern illustrated in FIG. 1 is obtained, for example.

It illustrates individual coarse particles of $Al_2O_3$ in a more or less homogeneous, fine-grained surrounding matrix, which likewise predominantly comprises $Al_2O_3$. Black areas characterize pores, which are not filled with resin during preparation of the samples. In this example, the structure-related range selected for the fine particulate matrix results in a relatively high open porosity (of approximately 15% by volume). As illustrated, this porosity is based on a large number of small pores and the pores do not form passages running across longer distances. Instead, there are interruptions and narrower areas within the pore network. Furthermore, pore passages are interrupted by more or less dense coarse-grained mixture components (from the other structure-related range). With a high open porosity, this results in a gas permeability of the product of $<1.10^{-13}$ $m^2$, measured on the basis of EN 993-4.

Accordingly, the invention takes a totally different approach than DE 100 54 125 A1. Whereas the open pores are selectively filled with molten/glass phase in the prior art, the open porosity of a fired, fireproof ceramic product based on the invention is retained, including during use (at application temperatures) and in any case is in excess of 10.0% by volume. This is desired because the high open porosity is one of the factors which is crucial to the desired structural elasticity of the product, as will be demonstrated below from the results of the wedge splitting test. For the purpose of the invention, the balance between coarse and fine grains in the mixture and hence in the finished fired product is of prime importance.

In one embodiment, the open porosity amounts to up to 30% by volume. The balance between the mixture components may be such and subsequent firing of the product conducted so that the pores of the finished product have the following characteristic distribution: More than half of the pores have a diameter of $d_{90}$<15 μm and more than ⅒ of the pores have a diameter of $d_{90}$>100 μm, and the proportion of pores between 15 and 100 μm is at most ⅐ or even at most ⅒ of the total open porosity. The distance between the fine and coarse pores (upper respectively lower threshold value) may be greater than or equal to a power of ten. This being the case, more than half of the open porosity may be accounted for by pores with a diameter of $d_{90}$<10 μm.

The mixture is predominantly made up of oxidic components. These include: $Al_2O_3$, $Al_2O_3$—$ZrO_2$, $ZrO_2$ (stabilized with CaO or MgO for example or non-stabilized), mullite, MgO, MgO—$Al_2O_3$, $Cr_2O_3$, MgO—$Cr_2O_3$, $SiO_2$, $Al_2O_3$—$Cr_2O_3$. The proportion of oxidic ceramic components with a fire resistance>1400° C. may be >80% by weight, in particular >90% by weight. In addition, non-oxidic elements may be present in the mixture, for example carbides, nitrides, borides or SiAlON.

The choice of mixture components should be made so that a fire resistance of at least 1,500° C., preferably >1,700 to 1,800° C., is obtained.

Accordingly, the materials may be selected so that even at the specified firing temperatures, the mixture contains less than 5% by weight of components which form molten phase at these temperatures. As a result, correspondingly minimal or even no molten phase elements occur or are present in the product, even during use.

Accordingly, products produced as proposed by the invention may have the following product properties:

refractoriness-under-load: [based on EN 993-8]: $T_{0.5}$: >1500° C., in particular >1700° C.

modulus of rupture at elevated temperatures: [based on EN 993-7]: at 1250° C.: >10 MPa, in particular >20 MPa cold crushing strength: [based on EN 993-5]: >50 MPa, in particular >80 MPa permeability to gas: [based on EN 993-4]: $<5\times10^{-13}$ $m^2$, in particular $<1\times10^{-3}$ $m^2$.

The invention will be explained in more detail below with reference to an example of an embodiment, which is partially compared with known products.

FIG. 1 illustrates the structure of a product fired at 1,750° C., which contains up to more than 90% by weight of aluminium oxide (Example 1, B1). The coarse $Al_2O_3$ grains, which are almost dense, may be seen. The distance between adjacent coarse $Al_2O_3$ grains corresponds more or less to the diameter of such a coarse grain. The fine particulate $Al_2O_3$ matrix incorporating numerous small pores may be seen between the coarse grains. The fine particulate matrix contains significantly more than 90% of the total open porosity.

The proportion of coarse grains accounts for approximately 20% by volume in the structure of the fired product. Accordingly, the volume of fine particulate matrix is approximately 80%.

Figure 2:
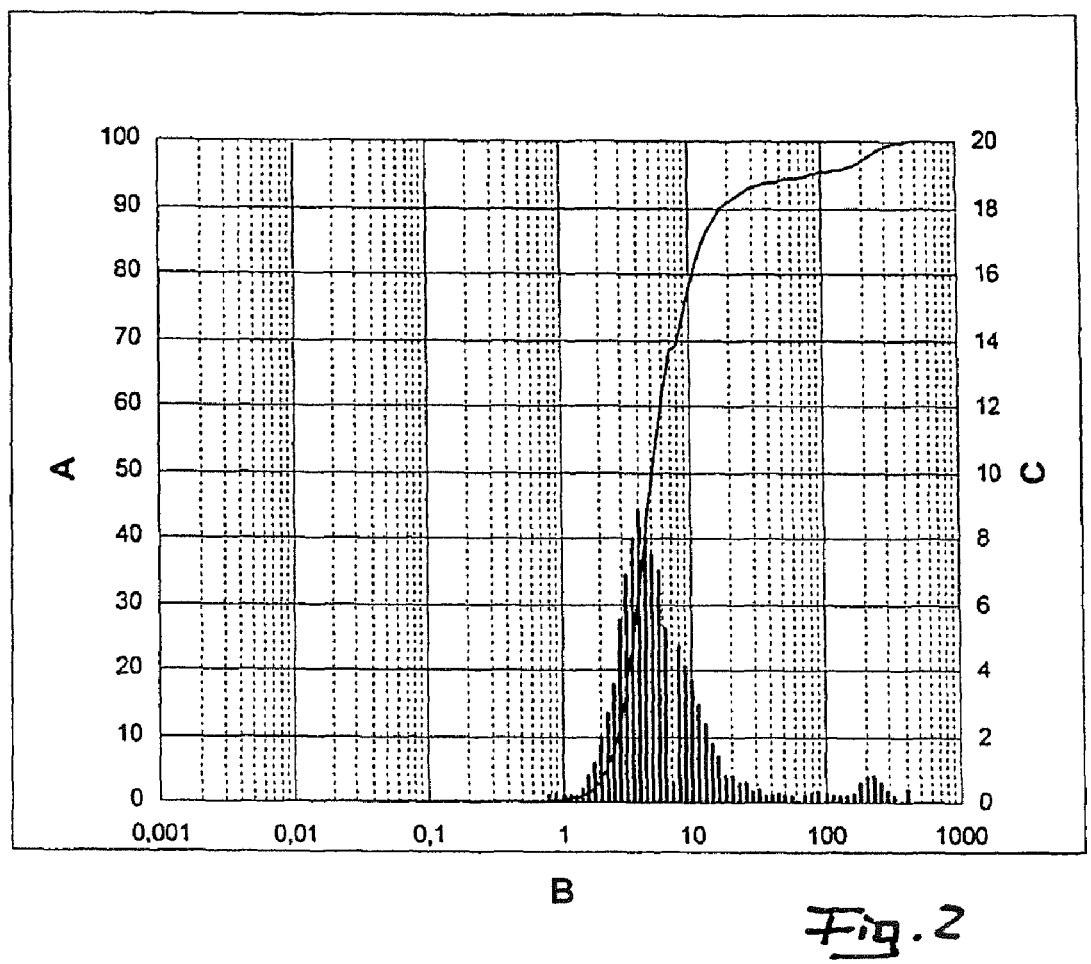
FIG. 2 illustrates a pore size distribution of the product illustrated in FIG. 1.

FIG. 2 illustrates the pore size distribution of the entire product illustrated in FIG. 1. The diameter in μm is plotted on axis (B), the relative open porosity by % is plotted on axis (A) and the pore distribution as a % is plotted along axis (C). A pore maximum in the range of 1 to 10 μm may be seen. Just short of 80% of the total open porosity is formed by pores with a diameter of between 1 and 10 μm. A second, less pronounced maximum in the pore size distribution occurs between 100 and 1,000 μm. These are singular large pores inside individual particles of the coarse-grained component or superficial pores on the surface of the coarse grains.

This product was found to have the following properties:
open porosity: 15.5% by volume
cold crushing strength: >280 MPa
modulus of rupture at elevated temperatures (1,400° C.): 18 MPa
permeability to gas: $0.7\times10^{-13}$ $m^2$
refractoriness-under-load: $T_{0.5}$>1700° C.

The cold crushing strength of the product after 30 temperature changes as stipulated by DIN 51068, Part 1, was approximately 280 MPa (determined as stipulated by DIN EN 993-5).

Example 2 (B2) relates to a product proposed by the invention based on $Al_2O_3$—$ZrO_2$. The mixture differs from the mixture specified in example 1 due to the fact that it contains a total of 8% by weight of $ZrO_2$, which has a grain size of <10 μm, i.e. the zirconium oxide is part of the fine particulate component of the mixture.

As with example 1, the coarse component based on aluminium oxide is encapsulated with the fine grain on a pelletizer plate. The finished pellets had a mean diameter of ca. 4 mm. The pellets were then pressed to form slabs with dimensions of 0.3×0.3×1 m and fired at 1,740° C.

The bulk density of the product was 3.5 g/cm$^3$. The open porosity was 13.5% by volume. The modulus of rupture at 1,400° C. was found to be 12 MPa. After 30 temperature changes as with example 1, the cold crushing strength was 120 MPa.

Figure 3:
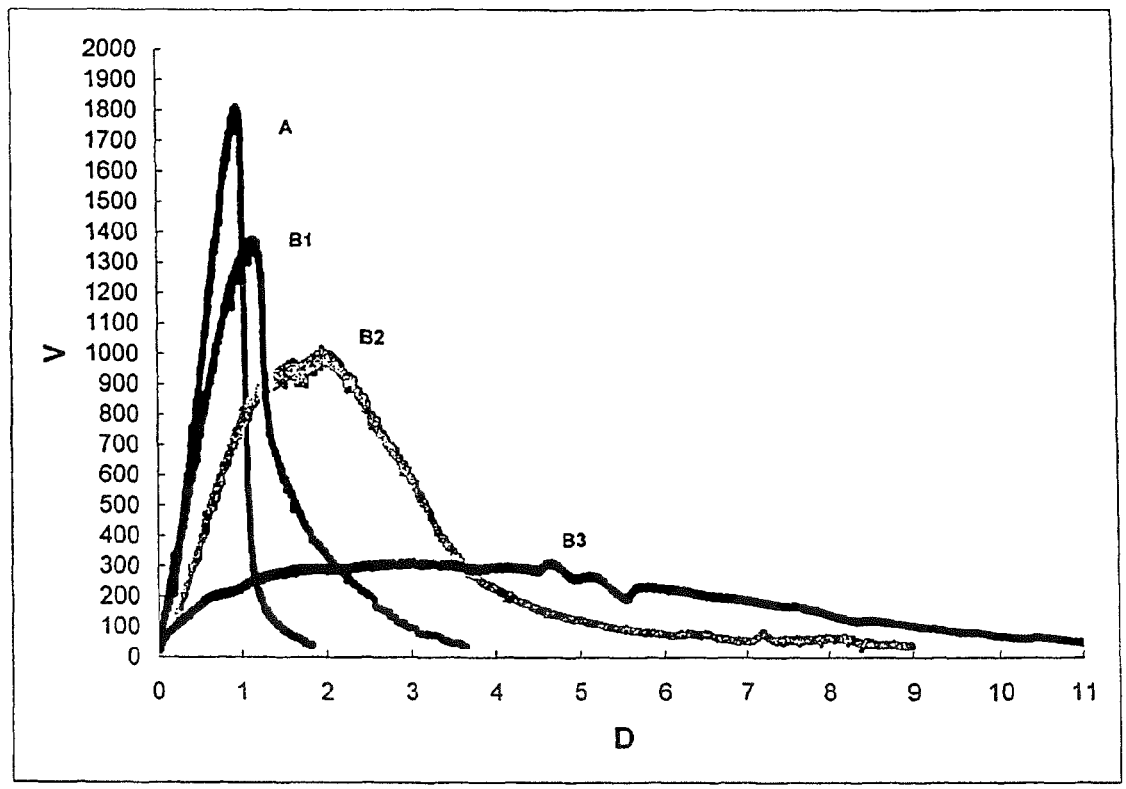
FIG. 3 illustrates test results of example products relative prior art.

The products based on examples 1, 2 (B1, B2) were then tested by means of what is known as a wedge splitting test, as described in WO 2005/085155 A1. FIG. 3 sets out the test results and does so in comparison with a product based on $Al_2O_3$ known from the prior art (sample A).

The wedge splitting test was conducted on the fired product at 1,250° C., "V" denoting the vertical load $F_v$ [N], and "D" denoting the vertical shift $\delta_v$ [mm].

The lower maximum force and the shift of the graphs on the right-hand side document the significantly higher structural elasticity of the samples proposed by the invention (B1, B2) compared with the prior art (A).

This is particularly clear on the curve in FIG. 3 denoted by B3, which is based on example 3. A $ZrO_2$ material stabilized with 3% by weight of MgO was used as the coarse grain (grain size 0.5-3 mm). The fine particulate refractory material in the mixture was $Al_2O_3$. During firing, the fine particulate $Al_2O_3$ reacts with the MgO from the coarse grain and forms a spinel seam (MgO—$Al_2O_3$-spinel) around the coarse grain. As illustrated in FIG. 3, the elasticity behaviour of the product fired at >1500° C. is obviously very positively affected by the mixed phase of the MA-spinel. The seam appears to be essential to the physical and mechanical properties of the entire structure. In the presence of sodium oxide, Mg—Na-aluminates may also form in the layer around the coarse grain.

Where figures are specified in the description given above in connection with the open porosity, pore size and pore size distribution of the sample as a whole, these are based on the corresponding definitions and specified methods of British Standard BS 1902-3.16: 1990. Measurements based on mercury-pressure porosimetry in accordance with this standard were taken with a device of the Micromeritics Auto Pore IV, 9400 V 105 type at 10 seconds equilibration time (compensation phase) per pressure stage (pressure level).

In addition to the pore sizes and the pore size distribution, the bulk density of the sample as a whole was determined from the open pore volumes obtained from the measurements, as specified in the standard, and the specified density values are likewise based on this standard.

The grain sizes in the structure were determined by reflected light microscopy and correlated with the proportions by volume of the relevant phases using the method described in Radex-Rundschau 1988, volume 4, pages 172-182. This method was used to determine the open porosity within individual areas of the structure (see claims 12, 13) on the proviso that only those pores in the micrograph with a length greater than 1 μm were detected.

The invention claimed is:

1. Fired, refractory ceramic product with an open porosity in excess of 10% by volume up to 30% by volume and a permeability to gas of <5×10$^{-13}$m$^2$, produced from a batch which contains less than 5% by weight of components which form molten phase at an application temperature of up to 1,500° C. and which, in addition to 50-90% by weight of fine particulate refractory material with a grain size of $d_{90}$<100 μm, contains 10-50% by weight of coarse particulate refractory material with a grain size of $d_{90}$>500 μm, and the proportion of particles with a grain size d90 of between 100-500 μm is limited to ≦10% by weight.

2. Product as claimed in claim 1, produced from a batch in which the fine particulate material has a grain size of $d_{90}$<50 μm.

3. Product as claimed in claim 1, produced from a batch which, in addition to 65-85% by weight of fine particulate material, contains 15-35% by weight of coarse particulate material.

4. Product as claimed in claim 1, produced from a batch in which the proportion of particles with a grain size $d_{90}$ between the fine particulate and the coarse particulate material is limited to ≦5% by weight.

5. Product as claimed in claim 1, in which more than half of the open porosity is made up of pores with a diameter $d_{90}$<15 μm and more than $\frac{1}{10}$ is made up of pores with a diameter $d_{90}$>100 μm, and the proportion of pores between 15 and 100 μm accounts for at most $\frac{1}{7}$ of the total open porosity.

6. Product as claimed in claim 5, in which more than half of the open porosity is made up of pores with a diameter $d_{90}$<10 μm.

7. Product as claimed in claim 5, in which the proportion of pores between 15 and 100 μm accounts for at most $\frac{1}{10}$ of the open porosity.

8. Product as claimed in claim 1, which satisfies at least one of the following test values:
   a) refractoriness-under-load as specified in EN 993-8>1, 500° C., in particular >1,700° C.
   b) modulus of rupture as specified by EN 993-7 at 1,400° C. >10 MPa
   c) cold crushing strength as specified by EN 993-5>50, in particular >80 MPa.

9. Product as claimed in claim 1, produced from pellets with a core of coarse particulate material with a casing of fine particulate material.

10. Product as claimed in claim 1, produced from pellets with a diameter $d_{90}$ of up to 4 mm.

11. Product as claimed in claim 1, in which ≦$\frac{1}{10}$ of the open porosity occurs in portions originating from the coarse particulate material of the batch.

12. Product as claimed in claim 1, in which ≦$\frac{1}{20}$ of the open porosity occurs in portions originating from the coarse particulate material of the batch.

13. Product as claimed in claim 1, produced from a mixture containing at least one of the following oxidic materials: $Al_2O_3$, $Al_2O_3$—$ZrO_2$, $ZrO_2$, mullite, MgO, MgO—$Al_2O_3$, $Cr_2O_3$, MgO—$Cr_2O_3$, $SiO_2$, $Al_2O_3$—$Cr_2O_3$.

14. Product as claimed in claim 1, produced from a mixture which contains at least one of the following non-oxidic materials: carbide, nitride, boride, SiAlON.

* * * * *